United States Patent [19]

Cadorniga et al.

[11] Patent Number: 5,508,350
[45] Date of Patent: Apr. 16, 1996

[54] RUBBER COMPOSITION FOR GOLF BALL CORE AND GOLF BALL COMPRISING SAID CORE

[75] Inventors: Lauro C. Cadorniga, Piedmont; Wayne R. Bradley, Seneca, both of S.C.

[73] Assignee: Dunlop Slazenger Corporation, Westminster, S.C.

[21] Appl. No.: 480,549

[22] Filed: Jun. 7, 1995

Related U.S. Application Data

[63] Continuation of Ser. No. 153,803, Nov. 16, 1993, abandoned.

[51] Int. Cl.$^6$ ............................ C08L 9/00; C08K 5/09; C08C 19/28; A63B 37/06
[52] U.S. Cl. ..................... 525/193; 525/274; 525/301; 524/399; 524/908; 273/230
[58] Field of Search .................... 525/193, 274, 525/301; 524/399; 273/230

[56] References Cited

U.S. PATENT DOCUMENTS

| | | | |
|---|---|---|---|
| 4,561,657 | 12/1985 | Tominaga et al. | 273/218 |
| 4,688,801 | 8/1987 | Reiter | 273/218 |
| 4,838,556 | 6/1989 | Sullivan | 273/220 |
| 4,844,471 | 7/1989 | Terence et al. | 273/220 |
| 5,306,760 | 4/1994 | Sullivan | 524/399 |

OTHER PUBLICATIONS

Concise Chem. & Tech Dic. –1975 pp. 115 & 469.

*Primary Examiner*—Carman J. Seccoro, Jr.
*Attorney, Agent, or Firm*—Lorusso & Loud

[57] ABSTRACT

Golf balls exhibiting an improved coefficient of restitution are obtained by including zinc palmeatate in the core formulation.

18 Claims, No Drawings

RUBBER COMPOSITION FOR GOLF BALL CORE AND GOLF BALL COMPRISING SAID CORE

This is a continuation of application(s) Ser. No. 08/153,803 filed on Nov. 16, 1993, now abandoned which designated the U.S.

BACKGROUND OF THE INVENTION

This invention relates to golf balls, and more particularly, to a golf ball made of an improved rubber composition.

Conventional golf balls are made by molding a cover about a core (typically 1½" diameter core). The core is either a solid core, solid mass of material, or a wound core, elastic thread wound about the center. The center may be either a solid mass of material or a liquid filled cavity which is frozen prior to winding. Golf balls with solid cores are generally referred to as "two piece" golf balls while golf balls with wound cores are generally referred to as "three piece" golf balls. One piece golf balls are made from a homogeneous mass of material.

Rubber compositions now used as cores for two piece golf balls are formulated to possess high hardness and high compressive strengths. With such a formulation, the resiliency to optimize flight distance performance can be achieved. "Click" and "feel" are other qualities sought from a golf ball. "Click" is the sound made by a golf club head when it hits the ball. "Feel" is the overall sensation transmitted to the golfer after hitting the ball.

The polybutadiene elastomer commonly used for the rubber component of a core is crosslinked by a large amount of a zinc salt of acrylic or methacrylic acid, in order to increase hardness without decreasing resilience. Golf ball compounds crosslinked by acrylic acid zinc salts have generally exhibited superior characteristics in terms of resilience but tend to be less durable. Ball forming compounds crosslinked by methacrylic acid zinc salts produce a ball of superior durability but at the expense of resilience.

To date, golf ball manufacturers have added fatty acids to the golf ball to obtain the desired resiliency and compressive strengths. For example, Tominaga et al, U.S. Pat. No. 4,561,657, teaches that an improved golf ball can be made from a rubber composition containing zinc acrylate coated with a fatty acid such as stearic acid whereby the golf ball exhibits proper hardness, good impact resilience and good sound and feel when hit. Another characteristic of this type of rubber composition is that it creates good roll workability and dispersability of rubber additives.

It is desirable, however, to obtain a golf ball with a softer feel, and desirable click with excellent flight and distance performances while maintaining resilience and getting a designed reduction of hardness and compressive strengths.

SUMMARY OF THE INVENTION

It is therefore an object of the present invention to provide a rubber composition formulation for use as a core in a two piece golf ball or as the composition for a one piece ball.

It is another object of the present invention to provide such a composition for golf balls to reduce hardness and compressive strengths yet maintain resilience.

A further object of the present invention is to provide such a composition so that golf balls produced have a softer feel and desirable click with excellent flight and distance performances.

These and other objects of the present invention are achieved with a formulation for golf balls in which zinc palmeatate is added to a polymer composition formulation either by in situ or by dry blend method. Preferably, the additive comprises 5–15% by weight on the total zinc salt of the polymer composition formulation. The formulation of the present invention produces a core for a two piece golf ball or a one piece golf ball with a designed reduction in hardness and compressive strengths while maintaining resilience and imparting softer feel and good playability to the golfer.

DETAILED DESCRIPTION OF THE INVENTION

At the outset, the present invention is described in its broadest overall aspects with a more detailed description following. The composition of the present invention for producing a core for a golf ball is a blend of a polymer, a metal salt of an unsaturated carboxylic acid, a free radical initiator and an additive of palmitic acid. The composition may optionally include fillers, and modifiers, as necessary to fulfill requirements determined by those skilled in the art.

The golf ball according to the present invention is produced from a polymer that mainly includes high-cis-polybutadiene rubber. High-cis-polybutadiene rubber is produced with the use of various kinds of catalysts (for example nickel-containing catalysts, neodymium-containing catalysts, titanium containing catalysts, cobalt-containing catalysts and the like) and it is different to some extent in its properties depending upon the kind of catalyst which is utilized. Other polymers in addition to the above described high-cis-polybutadiene rubber may be added or substituted.

The preferred high-cis-polybutadiene rubber is neodymium catalyzed, having 97% or higher content of cis 1–4 and Mooney viscosity ranges of 35–60. A suitable polybutadiene polymer of this type is available under the product name Europrene Neo Cis from Enichem Elastomers Ltd, Charleston Road, Hardley, Hythe, Southampton SO4 6YY U.K. Another suitable polybutadiene polymer is sold by Miles Polysar and manufactured by Bayer AG, Post Sach 100140, D4047 Dormagen Germany which is a subsidiary of Miles under the product name Buna CB. For use in the present invention, the preferred polybutadiene rubber will mix equal parts of the two above mentioned products, 50/50, based upon 100 parts by weight of all polymers.

The metal salt of an unsaturated carboxylic acid is used to crosslink the polymer. Suitable carboxylic acids include methacrylic, acrylic, dimethacrylic and diacrylic acids. Suitable metal ions include sodium, potassium, magnesium, cerium, zinc and cadmium, with zinc being preferred. The most preferred metal salts of the unsaturated carboxylic acids are therefore acrylate zinc salt, methacrylate zinc salt, diacrylate zinc salt and dimethacrylate zinc salt. The metal salt will be added in amounts ranging from 15 to 35 parts per hundred of the polymer formulation.

For the present invention, palmitic acid is introduced by an in situ method or zinc palmeatate (produced from palmitic acid and zinc oxide) is introduced by dry blend method to the polymer composition formulation. Specifically, 5% to 15% by weight of palmitic acid is introduced in the reaction vessel to process the zinc salt. More preferably, the composition includes 10–15% by weight of palmitic acid on total zinc salt. The zinc palmeatate, produced as described below, promotes a more reactive salt when compounded, especially to make cores for a two piece golf ball, than the current method of using zinc stearate as an additive. The more reactive resultant zinc salt of a fatty acid produces higher compressive strengths thereby also producing higher resilience on molded core/golf balls. A suitable zinc salt with zinc palmeatate is sold under the product name ZDA-J by Rockland React-Rite, Inc., 327 Industrial Drive, Rockmart, GA 30153.

The free radical initiator included in the core composition can be any known polymerization initiator which decomposes during the cure cycle. The amount of the selected initiator present is dictated only by the requirements of catalytic activity as a polymerization initiator. Suitable initiators for use in the present invention include peroxides, persulfates, azo compounds, hydrazines and the like. Peroxides such as dicumyl peroxide, nbutyl 4,4-bis (butylperoxide) valerate, 1,1-bis-(t-butylperoxy)-3,3,5-trimethylcyclohexane, di-t-butylperoxide and 3,5-di-(t-butylperoxy)-2,5 dimethylhexane and the like are readily commercially available and conveniently used, generally in amounts of from about 1.0 to about 5.0 and preferably in amounts of from about 1.0 to about 3.0 parts by weight based on 100 parts elastomer and most preferably 2.5 parts by weight of 40% active curative based upon 100 parts polymer. The preferred peroxide used in the present invention is 1,1,-bis-(t-butyl-peroxy)-3,3,5-trimethylcyclohexane.

In the present invention, zinc oxide is used as an activator, as well as optionally used as a filler, and its role in the reaction of the present invention will be described below. Zinc oxide will be present in the formulation of the present invention in an amount from about 5 to about 30 parts by weight based upon 100 parts elastomer, and preferably 15–22 parts by weight based upon 100 parts elastomer.

The core compositions of the present invention may additionally include any other suitable and compatible modifying ingredients including, but not limited to, other fillers, metal oxides, and diisocyanates.

As fillers, any known and conventional filler material, or mixtures thereof, may be used. Such fillers should be in finely divided form, as for example, of a size generally less than about 30 mesh and preferably less than about 100 mesh U.S. standard screen size. Suitable fillers include silica, silicates, zinc oxide, carbon black, cork, titania, cotton flock, cellulose flock, leather fiber, plastic and/or leather flour, asbestos, glass fibers, metal carbonates, barium sulfate in its natural or synthetic form, talc, graphite fibers and the like. Particularly useful as a filler is the oxide or carbonate of the cation present in the selected metal carboxylate component.

The amount of filler included in the core composition is primarily dictated by weight restrictions and is preferably from about 15 to about 30 parts by weight based on 100 parts elastomer.

To produce the core composition of the present invention, zinc palmeatate is formed initially. One method to produce zinc palmeatate is an in situ process. This process involves addition of acrylic acid, palmeatate acid and zinc oxide to a reactor vessel with a hydrocarbon solvent. The end products of above method are zinc diacrylate and zinc palmeatate, which are produced together in the reactor.

An alternate method of producing zinc palmeatate involves combining palmitic acid and ZnO, without acrylic acid present. The resulting product is zinc palmeatate. This can be accomplished by reactor process or hot roll mill process, and these methods are known to those skilled in the relevant art.

The first method produces zinc diacrylate coated and/or intimately blended with zinc palmeatate and the blend is added to the rubber composition as one component. With the second method, zinc palmeatate, manufactured by itself, is added as an individual component to the rubber composition. If this method is employed, then zinc diacrylate is also added as an individual component of the rubber composition.

Compounding of rubber stock is accomplished by an internal mixer, such as a Banbury mixer or an open mill process. The preferred method of mixing is Banbury or internal mixer. Rubber and various components comprising the formulation are added in a sequence which allows for homogeneous mixing, that does not reach incipient polymerization temperatures for the batch. The mixing cycle is dependent upon time, temperature, type, and mixing volume of equipment.

After mixing, the batch is discharged onto a drop mill. The stock is sheeted from the drop mill and allowed to cool. The stock is then extruded into preforms of desired weight and dimensions. This is accomplished by use of continuous extruding equipment or batch extrusion equipment.

The preforms of the composition will be cured by heating the composition at elevated temperatures on the order of from about 275° F. to about 350° F., preferably from about 295° F. to about 325° F., with molding of the composition effected simultaneously with the curing thereof. The composition can be formed into a core structure by using any one of a number of suitable molding techniques, e.g., injection, compression or transfer molding procedures. When the composition is cured by the application of heat, the time required for curing will normally be of short duration, generally from about 10 to about 20 minutes, depending upon the particular curing agent used. Those of ordinary skill in the art relating to free radical curing agents for polymers are conversant with adjustments of cure times and temperatures required to effect optimum results with any free radical generating agent.

After molding, the core is removed from the mold and the surface thereof is preferably treated to facilitate adhesion thereof to the covering compositions. Surface treatment can be effected by any of the several techniques known in the art, such as corona discharge, ozone treatment, sand blasting and the like. Preferably, surface treatment is effected by grinding with an abrasive wheel during a centerless grinding operation which yields a round core of approximately 1.5 inches in diameter.

Spew, which is cured cored stock, is formed during molding when excess preform material flows into adjacent overflow areas around the cavity halfs. This cured material is mechanically removed from the cores after the cores are removed from the moulds. The spew is loaded into grinding equipment. The resultant ground particles are passed through 30 mesh screens. The ground material is called regrind. This material is recycled and is used as a reinforcing filler to improve durability.

In a preferred embodiment of the present invention, the ground core spew, or "regrind", produced during this surface treatment, can be added to the formulation for a golf ball core, in amounts ranging from 3 to 10% by weight of compound formulation. The regrind will preferably have particle size less than 30 mesh.

The core is converted into a golf ball by providing at least one layer of covering composition thereon, ranging in thickness from about 0.050 to about 0.250 inch and preferably from about 0.060 to about 0.090 inch. The process to finish a golf ball with a cover is well known, and it is within the knowledge of those skilled in the art to finish a golf ball made with the core composition of the present invention.

Cores produced according to the present invention provide a golf ball having higher resilience and coefficients of restitution. More importantly for the golfer, the golf ball produced will have a desirable softer feel and click, with excellent flight and distance performances.

The following examples are to be considered as illustrative and not limiting.

Golf ball cores were made with the following compositions using conventional methods of mixing, extruding, surface finishing and molding to produce cores. Cores were covered with ionomer blends using conventional methods to produce golf balls. Compositions 1–28 are listed below. Average physical properties of the finished products, that is cores and balls, are listed as averages of the compression and coefficient of restitution.

| FORMULAS | 1 | 2 | 3 | 4 | 5 | 6 | 7 | 8 | 9 | 10 |
|---|---|---|---|---|---|---|---|---|---|---|
| MATERIALS | PHR | PHR | PHR | PHR | PHR | PHR | PHR | PHR | PHR | PHR |
| HI CIS POLYBUTADIENE | 100 | 100 | 100 | 100 | 100 | 100 | 100 | 100 | 100 | 100 |
| BARYTES | — | — | — | — | — | — | — | — | — | — |
| ZNO | 20.0 | 20.0 | 20.0 | 20.0 | 20.0 | 20.0 | 19.75 | 19.75 | 19.75 | 19.75 |
| ZDA | 26.5 | 26.5 | 26.5 | 26.5 | 26.5 | 26.5 | 27.5 | 27.5 | 27.5 | 27.5 |
| ZN PALMEATATE[1] | — | 4.68 | — | — | 2.34 | — | — | 4.85 | — | — |
| ZN PALMEATATE[2] | — | — | — | 4.68 | — | 2.34 | — | — | — | 4.85 |
| ZN STEARATE[1] | 4.68 | — | — | — | 2.34 | — | 4.85 | — | — | — |
| ZN STEARATE[2] | — | — | 4.68 | — | — | 2.34 | — | — | 4.85 | — |
| REGRIND | — | — | — | — | — | — | — | — | — | — |
| PEROXIDE | 2.5 | 2.5 | 2.5 | 2.5 | 2.5 | 2.5 | 2.5 | 2.5 | 2.5 | 2.5 |
| PHYSICAL PROPERTIES | | | | | | | | | | |
| AVG CORE COMPRESSION | 68 | 72 | 66 | 66 | 70 | 66 | 77 | 83 | 73 | 74 |
| AVG BALL COMPRESSION | 89 | 93 | 88 | 90 | 92 | 88 | 101 | 107 | 101 | 101 |
| AVG COEFFICIENT OF RESTITUTION | 0.733 | 0.737 | 0.732 | 0.733 | 0.735 | 0.734 | 0.742 | 0.750 | 0.744 | 0.745 |

| FORMULAS | 11 | 12 | 13 | 14 | 15 | 16 | 17 | 18 | 19 | 20 |
|---|---|---|---|---|---|---|---|---|---|---|
| MATERIALS | PHR | PHR | PHR | PHR | PHR | PHR | PHR | PHR | PHR | PHR |
| HI CIS POLYBUTADIENE | 100 | 100 | 100 | 100 | 100 | 100 | 100 | 100 | 100 | 100 |
| BARYTES | — | — | — | — | — | — | — | — | 18.3 | 18.3 |
| ZNO | 19.75 | 19.75 | 19.0 | 19.0 | 19.0 | 19.0 | 19.0 | 19.0 | 5.0 | 5.0 |
| ZDA | 27.5 | 27.5 | 31.0 | 31.0 | 31.0 | 31.0 | 31.0 | 31.0 | 22.5 | 22.5 |
| ZN PALMEATATE[1] | 2.42 | — | — | 5.47 | — | — | 2.73 | — | — | 4.0 |
| ZN PALMEATATE[2] | — | 2.42 | — | — | — | 5.47 | — | 2.73 | — | — |
| ZN STEARATE[1] | 2.42 | — | 5.47 | — | — | — | 2.73 | — | 4.0 | — |
| ZN STEARATE[2] | — | 2.42 | — | — | 5.47 | — | — | 2.73 | 3.0 | 3.0 |
| REGRIND | — | — | — | — | — | — | — | — | 6.75 | 6.75 |
| PEROXIDE | 2.5 | 2.5 | 2.5 | 2.5 | 2.5 | 2.5 | 2.5 | 2.5 | 2.5 | 2.5 |
| PHYSICAL PROPERTIES | | | | | | | | | | |
| AVG CORE COMPRESSION | 76 | 70 | 88 | 93 | 82 | 83 | 88 | 81 | 62 | 60 |
| AVG BALL COMPRESSION | 103 | 99 | 110 | 114 | 107 | 106 | 109 | 106 | 95 | 95 |
| AVG COEFFICIENT OF RESTITUTION | 0.744 | 0.741 | 0.748 | 0.754 | 0.743 | 0.747 | 0.748 | 0.745 | 0.738 | 0.737 |

| FORMULAS | 21 | 22 | 23 | 24 | 25 | 26 | 27 | 28 |
|---|---|---|---|---|---|---|---|---|
| MATERIALS | PHR | PHR | PHR | PHR | PHR | PHR | PHR | PHR |
| HI CIS POLYBUTADIENE | 100 | 100 | 100 | 100 | 100 | 100 | 100 | 100 |
| BARYTES | 18.3 | 18.3 | — | — | — | — | — | — |
| ZNO | 5.0 | 5.0 | 20.0 | 20.0 | 19.75 | 19.75 | 19.0 | 19.0 |
| ZDA | 21.7 | 21.7 | 26.5 | 26.5 | 27.5 | 27.5 | 31.0 | 31.0 |
| ZN PALMEATATE[1] | — | 3.8 | — | 4.68 | — | 4.85 | — | 5.47 |
| ZN PALMEATATE[2] | — | — | — | — | — | — | — | — |
| ZN STEARATE[1] | 3.8 | — | 4.68 | — | 4.85 | — | 5.47 | — |
| ZN STEARATE[2] | 3.0 | 3.0 | — | — | — | — | — | — |
| REGRIND | 6.75 | 6.75 | 8.75 | 8.75 | 8.75 | 8.75 | 8.75 | 8.75 |
| PEROXIDE | 2.5 | 2.5 | 2.5 | 2.5 | 2.5 | 2.5 | 2.5 | 2.5 |
| PHYSICAL PROPERTIES | | | | | | | | |
| AVG CORE COMPRESSION | 58 | 58 | 84 | 87 | 87 | 90 | 97 | 102 |

|  | | | | | | | | |
|---|---|---|---|---|---|---|---|---|
| AVG BALL COMPRESSION | 93 | 92 | 107 | 111 | 109 | 112 | 118 | 118 |
| AVG COEFFICIENT OF RESTITUTION | 0.737 | 0.738 | 0.744 | 0.746 | 0.742 | 0.745 | 0.751 | 0.754 |

[1] In situ
[2] Post added

With respect to formulas 1–6, all having zinc diacrylate (ZDA) levels of 26.5 phr, it was found that formula 2 which uses zinc palmeatate in situ when manufacturing ZDA has higher physical properties than the other formulas with the same ZDA level. The improvement in coefficient of restitution is apparent.

Formulas 7 through 12 have the same 27.5 ZDA phr level. Formula 8 which uses zinc palmeatate in situ produces a ball with higher physical properties and, again, the improvements in coefficient of restitution is apparent.

Formulas 13–18 all have a ZDA phr level of 31.0 with formula 14 which uses zinc palmeatate in situ producing a ball with the best physical properties.

Formulas 19–20 having ZDA phr levels at 22.5 and formulas 21 and 22 with levels of 21.7 use ZDA phr levels below normal usage. In these instances, however, the addition of regrind is shown to improve durability and compression, and adding 3 phr zinc stearate raises coefficient of restitution The addition of barytes achieves desired core weight and reduces cost.

Formulas 23–24, with a ZDA phr level at 26.5 and the addition of regrind at 8.75 phr illustrates that the addition of regrind improves coefficient of restitution and raises core and ball compression.

Formulas 25–26 have a ZDA phr level of 27.5, and formulas 27 and 28 have levels of 31 phr. These formulas also include 8.75 phr of regrind, which illustrates that with that addition, core compression and ball compression are raised without improving coefficient of restitution. Formula 26 has comparable ingredients as formula 8 except it also includes regrind but does not show improved properties. The same comparison is made with formula 28 and formula 14 but shows raised core compression and ball compression without improving coefficient of restitution In conclusion, it is noted that using 26.5 to 31 phr ZDA with zinc palmeatate in situ improves coefficient of restitution. The addition of regrind at 26.5 phr level ZDA with zinc palmeatate in situ also improves coefficient of restitution. The addition of regrind at ZDA phr level between 26.5–27.5 does not improve coefficient of restitution. Between 27.5–31 phr ZDA using zinc palmeatate in situ, the addition of regrind increased ball compression and core compression. That formula having 27.5 phr ZDA results in coefficient of restitution being reduced, but at 31 phr ZDA the coefficient of restitution is constant. It is also seen that regrind usage improves durability at low levels of ZDA usage.

Additional formulas were developed using alternative polymer components, as follows. A golf ball was produced as described above. The following tables illustrate durability changes. The larger the number, the more durable the golf ball becomes.

| FORMULAS | 1 | 2 | 3 | 4 | 5 | 6 | 7 | 8 | 9 | 10 |
|---|---|---|---|---|---|---|---|---|---|---|
| MATERIALS | PHR | PHR | PHR | PHR | PHR | PHR | PHR | PHR | PHR | PHR |
| NEO CIS 40 | 50 | 50 | 50 | 50 | 50 | 50 | 50 | 50 | 50 | 50 |
| CB-23 | 50 | 50 | 50 | 50 | 50 | 50 | 50 | 50 | 50 | 50 |
| BARYTES | — | — | — | — | — | — | — | — | — | — |
| ZNO | 20.0 | 20.0 | 20.0 | 20.0 | 20.0 | 20.0 | 19.75 | 19.75 | 19.75 | 19.75 |
| ZDA | 26.5 | 26.5 | 26.5 | 26.5 | 26.5 | 26.5 | 27.5 | 27.5 | 27.5 | 27.5 |
| ZN PALMEATATE[1] | — | 4.68 | — | — | 2.34 | — | — | 4.85 | — | — |
| ZN PALMEATATE[2] | — | — | — | 4.68 | — | 2.34 | — | — | — | 4.85 |
| ZN STEARATE[1] | 4.68 | — | — | — | 2.34 | — | 4.85 | — | — | — |
| ZN STEARATE[2] | — | — | 4.68 | — | — | 2.34 | — | — | 4.85 | — |
| REGRIND | — | — | — | — | — | — | — | — | — | — |
| PEROXIDE | 2.5 | 2.5 | 2.5 | 2.5 | 2.5 | 2.5 | 2.5 | 2.5 | 2.5 | 2.5 |
| PHYSICAL PROPERTIES | | | | | | | | | | |
| AVG CORE WT | 35.08 | 34.95 | 34.90 | 34.88 | 34.96 | 34.91 | 35.00 | 34.93 | 34.72 | 34.82 |
| AVG BALL WT | 45.55 | 45.54 | 45.35 | 45.34 | 45.48 | 45.35 | 45.56 | 45.56 | 45.31 | 45.35 |
| AVG DURABILITY | 114 | 125 | 84 | 119 | 101 | 110 | 119 | 146 | 119 | 124 |

| FORMULAS | 11 | 12 | 13 | 14 | 15 | 16 | 17 | 18 | 19 | 20 |
|---|---|---|---|---|---|---|---|---|---|---|
| MATERIALS | PHR | PHR | PHR | PHR | PHR | PHR | PHR | PHR | PHR | PHR |
| NEO CIS 40 | 50 | 50 | 50 | 50 | 50 | 50 | 50 | 50 | 50 | 50 |
| CB-23 | 50 | 50 | 50 | 50 | 50 | 50 | 50 | 50 | 50 | 50 |
| BARYTES | — | — | — | — | — | — | — | — | 18.3 | 18.3 |
| ZNO | 19.75 | 19.75 | 19.0 | 19.0 | 19.0 | 19.0 | 19.0 | 19.0 | 5.0 | 5.0 |
| ZDA | 27.5 | 27.5 | 31.0 | 31.0 | 31.0 | 31.0 | 31.0 | 31.0 | 22.5 | 22.5 |
| ZN PALMEATATE[1] | 2.42 | — | — | 5.47 | — | — | 2.73 | — | — | 4.0 |
| ZN PALMEATATE[2] | — | 2.42 | — | — | — | 5.47 | — | 2.73 | — | — |
| ZN STEARATE[1] | 2.42 | — | 5.47 | — | — | — | 2.73 | — | 4.0 | — |
| ZN STEARATE[2] | — | 2.42 | — | — | 5.47 | — | — | 2.73 | 3.0 | 3.0 |

-continued

| | | | | | | | | | | |
|---|---|---|---|---|---|---|---|---|---|---|
| REGRIND | — | — | — | — | — | — | — | — | 6.75 | 6.75 |
| PEROXIDE | 2.5 | 2.5 | 2.5 | 2.5 | 2.5 | 2.5 | 2.5 | 2.5 | 2.5 | 2.5 |
| PHYSICAL PROPERTIES | | | | | | | | | | |
| AVG CORE WT | 34.98 | 34.73 | 35.01 | 35.01 | 34.86 | 34.90 | 34.99 | 34.86 | 35.20 | 35.24 |
| AVG BALL WT | 45.55 | 45.32 | 45.68 | 45.68 | 45.44 | 45.48 | 45.65 | 45.46 | 45.24 | 45.21 |
| AVG DURABILITY | 109 | 98 | 106 | 108 | 116 | 129 | 133 | 111 | 145 | 163 |

| FORMULAS | 21 | 22 | 23 | 24 | 25 | 26 | 27 | 28 |
|---|---|---|---|---|---|---|---|---|
| MATERIALS | PHR | PHR | PHR | PHR | PHR | PHR | PHR | PHR |
| NEO CIS 40 | 50 | 50 | 50 | 50 | 50 | 50 | 50 | 50 |
| CB-23 | 50 | 50 | 50 | 50 | 50 | 50 | 50 | 50 |
| BARYTES | 18.3 | 18.3 | — | — | — | — | — | — |
| ZNO | 5.0 | 5.0 | 20.0 | 20.0 | 19.75 | 19.75 | 19.0 | 19.0 |
| ZDA | 21.7 | 21.7 | 26.5 | 26.5 | 27.5 | 27.5 | 31.0 | 31.0 |
| ZN PALMEATATE[1] | — | 3.8 | — | 4.68 | — | 4.85 | — | 5.47 |
| ZN PALMEATATE[2] | — | — | — | — | — | — | — | — |
| ZN STEARATE[1] | 3.8 | — | 4.68 | — | 4.85 | — | 5.47 | — |
| ZN STEARATE[2] | 3.0 | 3.0 | — | — | — | — | — | — |
| REGRIND | 6.75 | 6.75 | 8.75 | 8.75 | 8.75 | 8.75 | 8.75 | 8.75 |
| PEROXIDE | 2.5 | 2.5 | 2.5 | 2.5 | 2.5 | 2.5 | 2.5 | 2.5 |
| PHYSICAL PROPERTIES | | | | | | | | |
| AVG CORE WT | 35.30 | 35.20 | 35.48 | 35.48 | 35.38 | 35.43 | 35.49 | 35.56 |
| AVG BALL WT | 45.16 | 45.17 | 45.54 | 45.47 | 45.53 | 45.42 | 45.67 | 45.68 |
| AVG DURABILITY | 165 | 163 | 106 | 153 | 129 | 180 | 195 | 190 |

[1] In situ
[2] Post added

Physical properties were tested as indicated herein. Average core compression is measured in 0.001 inch deflection given in PGA units. Average core weight is measured in grams. Average ball compression is the same measurement as with cores, except finished golf balls made with the various formulas are compressed. The average ball weight is measured in grams. Average coefficient of restitution indicates an average of ball velocity, measuring rebound velocity/forward velocity. Average durability means the number of hits before mechanical failure of a group of samples.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and there is no intention to exclude any equivalence thereof. Hence, it is recognized that various modifications are possible when within the scope of the present invention as claimed.

What is claimed is:

1. A golf ball comprising a cover and a molded single fatty acid core, said single fatty acid core comprising:
   an elastomer selected from high-cis polybutadiene and mixtures of high-cis polybutadiene with other elastomers;
   25–37 phr based upon 100 phr elastomer of a homogeneous blend of 85–95% by weight zinc diacrylate and 5–15% by weight zinc palmeatate, formed from the reaction of
   palmitic acid,
   acrylic acid, and
   zinc oxide; and
   1.0–5.0 parts by weight of a free radical initiator based upon 100 parts elastomer.

2. The golf ball of claim 1 wherein the core further comprises 3–20 phr by weight of zinc oxide.

3. The golf ball of claim 1 wherein the core further comprises 3–20 phr by weight of zinc oxide and one or more fillers.

4. The golf ball of claim 1 wherein the core comprises 1.0–3.0 parts by weight of a free radical initiator based upon 100 parts elastomer.

5. The golf ball of claim 4 wherein the core further comprises 3–20 phr by weight of zinc oxide.

6. The golf ball of claim 4 wherein the core further comprises 3–20 phr by weight of zinc oxide and one or more fillers.

7. The golf ball of claim 1 wherein the core further comprises ground core spew in the amount of 3 to 10% by weight of the core formulation.

8. An improved core composition for a golf ball, said composition comprising
   an elastomer selected from high-cis polybutadiene and mixtures of high-cis polybutadiene with other elastomers;
   25–37 phr based upon 100 phr elastomer of a homogeneous blend of 85–95% by weight zinc diacrylate and 5–15% by weight zinc palmeatate, formed from the reaction of
   palmitic acid,
   acrylic acid, and
   zinc oxide; and
   1.0–5.0 parts by weight of a free radical initiator based upon 100 parts elastomer.

9. The core composition of claim 8 further comprising 3–20 phr by weight of zinc oxide.

10. The core composition of claim 8 further comprising 3–20 phr by weight of zinc oxide and one or more fillers.

11. The core composition of claim 8 wherein the core comprises:
    1.0–3.0 parts by weight of a free radical initiator based upon 100 parts elastomer.

12. The core composition of claim 11 further comprising 3–20 phr by weight of zinc oxide.

13. The core composition of claim 11 further comprising 3–20 phr by weight of zinc oxide and one or more fillers.

14. The composition of claim 8 wherein the core further comprises ground core spew in the amount of 3 to 10% by weight of the composition.

15. A method for making an improved core for a high performance two piece golf ball comprising:
   (a) providing a base elastomer selected from high-cis polybutadiene and mixtures of high-cis polybutadiene with other elastomers;
   (b) providing 25–37 phr based upon 100 phr elastomer of a homogeneous blend of 85–95% by weight zinc diacrylate and 5–15% by weight zinc palmeatate, formed from the reaction of
   palmitic acid
   acrylic acid, and
   zinc oxide; and
   (c) blending the compositions of step (a) and (b) with 1.0 to 5.0 parts by weight of a free radical initiator based upon 100 parts elastomer;
   (d) molding the composition of step (c) to form a golf ball core.

16. The method of claim 15 further comprising blending 3–20 phr by weight of zinc oxide into the blend of step (c).

17. The method of claim 15 further comprising blending 3–20 phr by weight of zinc oxide and one or more fillers into the blend of step (c).

18. The method of claim 15 further comprising the step of adding 3–10% by weight ground core spew with particle size less than 30 mesh to the composition mixing in step (c) prior to the molding step.

* * * * *